United States Patent [19]

Loubier

[11] Patent Number: 4,496,303

[45] Date of Patent: Jan. 29, 1985

[54] METHOD OF FABRICATING A PERMANENT MAGNET

[75] Inventor: Robert J. Loubier, Fort Wayne, Ind.

[73] Assignee: Xolox Corporation, Fort Wayne, Ind.

[21] Appl. No.: 382,391

[22] Filed: May 27, 1982

[51] Int. Cl.³ .............................................. B29F 1/03
[52] U.S. Cl. .................................... 425/569; 425/511;
  425/DIG. 33; 335/303
[58] Field of Search ....................... 335/302, 303, 306;
  425/543, 568, 569, 571, DIG. 33, DIG. 227,
  DIG. 243; 264/108, DIG. 58

[56] References Cited

U.S. PATENT DOCUMENTS 3,985,588 10/1976 Lyman ................................ 335/302
4,010,434 3/1977 Kools .................................. 335/302

Primary Examiner—George Harris
Attorney, Agent, or Firm—George A. Gust

[57] ABSTRACT

A plastic bonded magnet is formed of a solidified mixture of thermoplastic powder and magnetic particles capable of being permanently magnetized. The magnet in one form is cylindrical and provided with a coaxial bore. The particles are substantially uniformly dispersed throughout the magnet in coaxial sections extending between the cylinder axis and the periphery of the magnet. Also the particles are substantially commonly aligned throughout. A given quantity of the particles may be orientable which leads to the common alignment.

The method of fabricating the magnet includes the steps of mixing quantities of plastic material and solid magnetizable particles to obtain a substantially uniform mixture. The mixture is injection molded to form the magnetic body, the molding step including the injection of the mixture into a cavity having a form of the body, primarily cylindrical, and through a disc-shaped gating orifice on the aforesaid axis, which is midway between the body ends. The orifice opens radially into the cavity uninterruptedly completely around said axis whereby the molten mixture fills the cavity uniformly radially from the axis and the perimeter of the orifice. Upon solidification of the molten plastic, the particles will be secured in position.

6 Claims, 6 Drawing Figures

METHOD OF FABRICATING A PERMANENT MAGNET

BACKGROUND OF THE INVENTION

Field of the Invention

In the art of injection molding of, for example, cylindrical bodies using a thermoplastic material, gating of the plastic into the mold cavity is conventionally accomplished at various positions about the cavity, for example, at the periphery, at an end offset from the cavity axis as well as on the axis itself. Gating at a location other than the center or on axis results in a flow pattern of molten material in filling the cavity along two or more paths which are physically separated. The material in following these paths eventually joins at finite locations thereby forming weld lines which in many instances can be visually perceived. By using axial or center gating, the injected material flows radially outwardly in all directions thereby filling the cavity uniformly, thereby avoiding the creation of such weld lines.

Plastic bonded magnets, including those which are cylindrical, are well known as disclosed and claimed in U.S. Pat. Nos. 3,842,148; 3,872,334 and 3,881,853. In these patents, gating is accomplished by a means of a sprue and gate located off-center of a cylindrical cavity which will, as just explained, produce a flow pattern resulting in weld lines. The magnet is formed of a mixture of thermoplastic powder and physically orientable, magnetizable particles such that by reason of the circuitous flow of the molten mixture in filling the cavity, a non-uniform alignment of magnetic particles within the cavity results as evidenced by a disparity in the geometric arrangement at the weld lines. As a consequence of this non-uniform arrangement, the magnetic properties of the magnet in cylindrical form will be correspondingly non-uniform about its periphery. In those instances in which uniform magnetic properties are required, off-center gating therefore should not be used.

SUMMARY OF THE INVENTION

The present invention relates to improvements in the uniformity of magnetic properties in certain designs of plastic bonded magnets and also as to the method of injection molding such magnets.

The method of fabricating a permanently magnetizable body, and in particular one of cylindrical shape having a coaxial bore, of plastic material filled with physically orientable particles which are permanently magnetizable and with said body being provided with opposite ends having an axis of symmetry extending therebetween comprises the steps of mixing quantities of plastic material and solid magnetizable particles to obtain a substantially uniform mixture. The mixture is injection molded, such molding including the injection of the mixture into a cavity having the form of the body and through a gating orifice located on said axis and between said ends. The orifice which may be disc-shaped is arranged to open radially into the cavity uninterruptedly completely around the axis whereby the molten mixture fills the cavity uniformly radially from the orifice. The molten plastic is solidified thereby securing the particles in position. The particles are thus dispersed and aligned substantially uniformly throughout the solidified body in a direction extending radially in all directions from the axis.

The bonded magnet of this invention includes a body of magnetizable material which includes a solidified mixture of thermoplastic powder and magnetic particles of orientable shape which are capable of being permanently magnetized. The body, in one form being cylindrical, is provided with opposite ends having an axis of symmetry therebetween. The particles are substantially uniformly dispersed throughout the body in coaxial sections extending between the axis and the body periphery. In certain instances, a given quantity of the particles are orientable and as a consequence of injection molding, a percentage of these orientable particles are commonly aligned. Such a magnet in cylindrical form possesses uniform magnetic properties about the circumference thereof.

It is an object of this invention to provide a method for fabricating a plastic bonded magnet, and in particular one that is cylindrical, having uniform magnetic properties about the circumference thereof.

It is another object to provide a plastic bonded magnet having such properties.

The above-mentioned and other features and objects of this invention and the manner of attaining them will become more apparent and the invention itself will be best understood by reference to the following description of an embodiment of the invention taken in conjunction with the accompanying drawings.

DESCRIPTION OF THE PREFERRED EMBODIMENT

Figure 2:
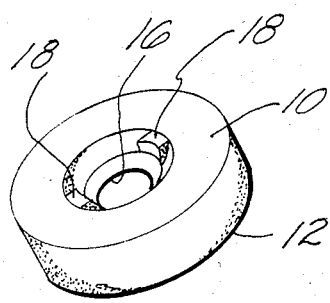
FIG. 2 is a perspective illustration of a typical magnet.
Figure 3:
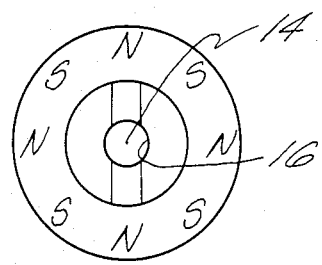
FIG. 3 is a top plan view thereof and further illustrates a typical pattern of polarizing the magnet for use as a rotor in a small electric motor.

Referring to the drawings, and more particularly to FIGS. 2 and 3, a typical plastic bonded magnet of cylindrical configuration is shown. The magnet has opposite end faces 10 and 12 which are flat and an axis of symmetry 14 which extends between the surfaces 10 and 12. Further, the magnet is provided with a coaxial bore 16 segments 18. Such magnet being cylindrical and polarized on the circumference as shown in FIG. 3 finds particular utility as the rotor for an electric motor, the bore 16 being sized and shaped to receive a force-transmitting element, such as a shaft, an insert, bushing or the like in snug, fitting relationship. This disclosure assumes that the magnet is to be used for this purpose.

This magnet is fabricated preferably by injection molding a mixture of essentially two ingredients, one a thermoplastic material and the other magnetic particles of the type which may be permanently magnetized, these typically being either isotropic or anisotropic. Typical of the thermoplastic material is polyamide, known in the trade as Nylon, a trademark of E.I. du-Pont de Nemours Corp.

Typical of the magnetic material is barium ferrite in particle sizes conventionally available. Typical sizes of such particles vary from one to ten microns. They may be either coarser or finer as desired. The particles have some "orientable shape" such as flat or elongated as compared with spheres, for example, which are not physically orientable as will become apparent from the explanation that follows. Barium ferrite, for example, exists in the form of crystal platelets having a hexagonal periphery, such platelets being broader than thick and having a preferred direction of magnetization normal to flat sides. Only a minimal field can be obtained by magnetizing the platelets in the plane thereof; hence, the position or orientation of each platelet in the body can affect the character and uniformity of the magnetic field produced by the body as a whole when it is magnetized according to a desired pole pattern. For example, assuming a pole pattern as depicted in FIG. 3, the relative strengths of the poles could vary due to the orientation of the platelets in the regions of the respective poles.

Figure 1:
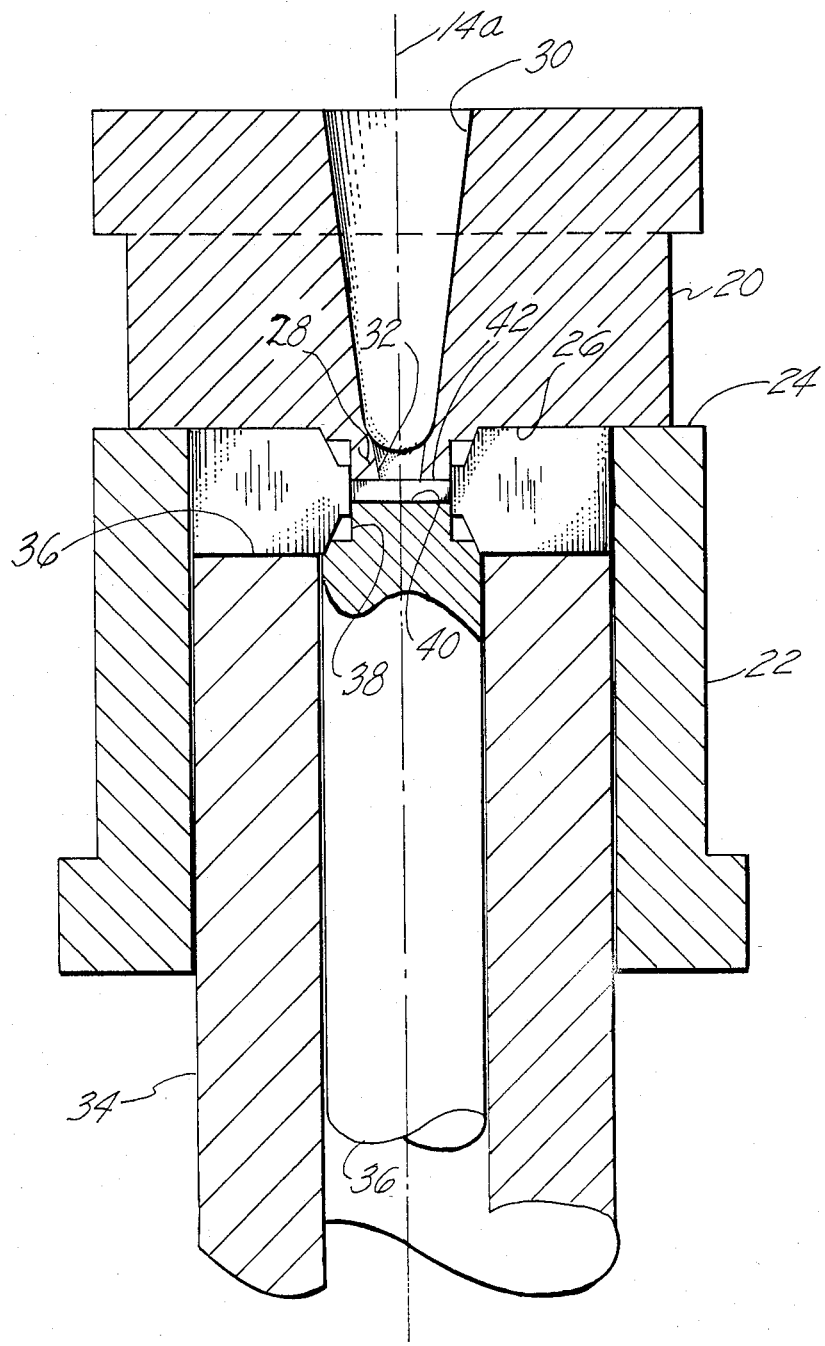
FIG. 1 is a cross section of a mold apparatus used in connection with fabricating a plastic bonded magnet of this invention.

Referring to FIG. 1, the method and apparatus employed in this invention will be described. The magnet is fabricated as a single unit preferably by injection molding. The mold apparatus is essentially in two sections, an upper mold member 20 and a lower mold member 22. These mold members have parting surfaces 24 which are flat and engageable, these surfaces defining in part the cylindrical mold cavity indicated generally by the numeral 26. The upper surface of the cavity 26 is defined by the lower parting surface 24 on the upper mold member 20 as shown, a cylindrical projection or core pin portion 28 being coaxially provided centrally of the upper mold member 20 which serves to provide a portion of the cylindrical bore 16 of the finished part. The bottom end of the pin portion 28 is flat and coaxial with respect to the axis of symmetry 14a of the cylindrical cavity 26. Centrally of the upper mold member 20 is an elongated, tapered passage or sprue 30 having a reduced diameter end 32 which opens through the center of the bottom surface of the pin portion 28. It will be noted that this bottom surface is disposed substantially midway between the opposite end surfaces of the mold cavity 26.

Slidably disposed within the lower mold member 22 is a cylindrical ejector sleeve 34 having a flat upper end 36 that serves as the bottom, flat surface of the mold cavity 26. Slidably mounted within the ejector sleeve 34 is a cylindrical core pin 36 having a reduced diameter upper end 38 of a size equal to the diameter of the pin portion 28. The upper end 40 is flat and parallel to the lower surface of the pin portion 28 and is spaced therefrom to provide a disc-shaped gate 42 coaxial with respect to the axis 14a. The gate 42 opens radially into the cavity 26, the thickness or width of this gate being typically 0.030 inch. The parts 20, 22, 34 and 36 are relatively movable in accordance with conventional practice to form initially the mold cavity 26 and to extract the part from the cavity after it has been molded. Suffice it to say, the sprue 30 and the gate 42 are coaxially and axially centered relative to the mold cavity 26.

In molding a magnet according to this invention, a mixture, in powder form, of suitable thermoplastic material and magnetic particles of orientable shape, is thoroughly mixed and then fed into a conventional injection molding machine in which the mold of FIG. 1 is mounted. This material is injected through the sprue 30 and gate 42 into the cavity 26 until it is filled. The molten plastic containing the magnetic particles is then permitted to solidify, following which the mold apparatus is opened and the molded part is ejected. The solidified plastic in the sprue passage 30 breaks clean from the solidified disc within gate 42, upon opening of the mold due to the taper of passage 30. The plastic disc may then be removed by means of a suitable punch which shears the disc where it joins bore 16. This leaves the portions of bore 16 on opposite sides of the sheared section which are smooth and to finished size and determined by the core pin portions. This is an important feature as will become apparent from the following.

Figure 4:
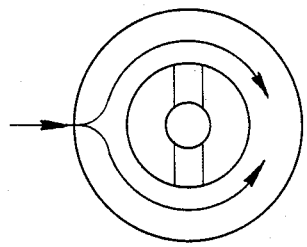
FIG. 4 is a diagrammatic illustration of a prior art method of injection molding and is used in explaining the principles of the present invention.

The molded part as extracted from the mold will have no weld lines as previously explained. In further explanation, typical such weld lines is illustrated in FIG. 4 in which material is gated at the periphery of the mold cavity as indicated by the arrow 44. Assuming that the cavity has a solid core pin 46 in the center to form a bore, liquid plastic injected via the gate 44 will flow essentially along two circumferential paths 48 and 50 until the molten material meets in a front or region indicated by the dashed radial line 52. From the point of such merger, the cavity completely fills. As is well known, this flow pattern results in a discontinuity within the resulting plastic body known as a weld line.

It has been discovered that such weld lines in plastic magnets of the type contemplated by this invention leads to discontinuities or non-uniform magnetic properties, which includes particles of "orientable shape", when measured circumferentially thereof. The reason for this is that magnetic particles tend to disperse unevenly, in other words to orient differently, in the region of the weld line as compared with other parts of the body. Since the body thus has a different orientation of magnetic particles in one portion as compared with others, it follows that the magnetic properties of the magnet as measured around the circumference thereof will correspondingly vary.

It has also been discovered that the flow of orientable shapes, such as flat as for platelets or elongated, of magnetic particles through the gate and into the cavity results in some common alignment of a percentage of the particles within the body that is molded. This alignment is theorized to be the simple result of flow of the molten plastic, the particles tending to become aligned as logs will flowing down a river in a typical logging operation.

It is further theorized that gating in a manner which produces weld lines results in the flowing, aligned particles in effect colliding where the melt fronts merge and thereby turning or becoming aligned differently. Thus, the particles in the region of the weld lines have a different orientation than in the other regions of the cavity.

Figure 5:
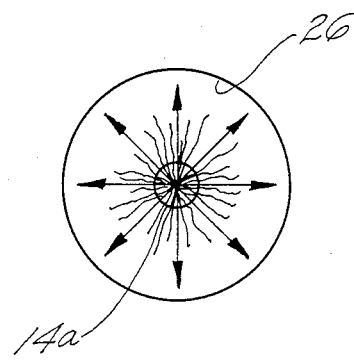
FIG. 5 is a view similar to that of FIG. 4 but graphically showing a desired flow pattern as obtained in this invention.

In this invention, the flow pattern of the molten mixture into the cavity 26 is shown in FIG. 5, this flow pattern being radial in all directions from the axis 14a. Thus, the cavity fills from the periphery inwardly toward the center in a uniform manner and without forming weld lines. This results in an even, uniform distribution and orientation of magnetic particles throughout the cavity and in the molded part upon solidification as viewed outwardly in all directions from the axis 14a. Taking coaxial sections of the body would thus reveal that particle concentration and alignment throughout the surface of the section would be substantially uniform. Thus, in magnetizing the molded part according to the pole pattern as shown in FIG. 3 wherein North and South poles are alternated for each angle of 45° of the cylindrical shape, all of the poles about the circumference of the body will exhibit the same, uniform properties.

Figure 6:
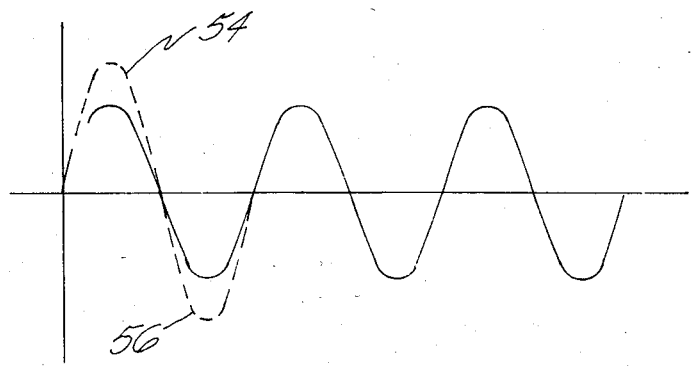
FIG. 6 is a graph used in explaining the uniform magnetic properties of a plastic bonded magnet made according to the present invention.

This uniformity is further illustrated by the graph of FIG. 6 wherein the magnetic or pole properties, proceeding about the circumference of the magnet, are illustrated by the sinusoidal wave, the ordinate of the graph being in terms of field strength or gauss and the abscissa being in terms of rotation of the magnet about its axis. Such a graph might be observed by positioning a Hall Effect sensor adjacent to the periphery of the plastic part and spinning the latter about its axis 14. The important factor to note is that the strengths of the poles are uniform from pole to pole as indicated by the common amplitude of the cycles in the sine wave.

The significance of this is further appreciated by examining magnetic properties of the same part molded as explained in connection with FIG. 4: in this instance certain of the poles could exhibit high strength as indicated by the dashed cycles 54 and 56 which are of a different amplitude than the cycles representing the remaining poles. Since uniformity in magnetic properties is an objective, it is thus appreciated that by gating in the center or on axis of the mold cavity yields the more uniform result.

Summarizing, as a rotor for an electric motor, the body 12 should possess certain characteristics such as: (a) be magnetizable about its circumference, (b) have a coaxial bore properly formed to receive a force-transmitting element as previously explained, (c) be as perfectly round and concentric as possible, and (d) have uniform magnetic properties throughout. In the present invention, the bore 16 is formed in such a manner to be substantially coaxial with respect to the circumference and have a wall surface of such character that a force-transmitting element, such as a shaft, can be fitted easily thereto to provide for essentially concentric rotation. The cylindrical geometry is as perfect as possible, within the limits afforded by injection molding, to minimize eccentricities and impairment of operating efficiency. The uniform magnetic properties combine with this geometry to contribute further to such efficiency and operation.

Center gating as disclosed is instrumental in achieving such a rotor. It leads to proper cavity fill, roundness of the finished part, a properly formed center bore, and uniform magnetic properties. By positioning the gate midway between the cavity ends rather than at one end, smooth bore portions on opposite sides of the gate are assured. A fitted shaft thus receives necessary axial support to assure concentric, firm mounting. Also, this center gating provides for automatic severing of the sprue in passage 30 upon opening the mold.

By following the relatively simple method of this invention, all of the steps involved lead to the production of uniformly magnetizable rotors efficiently and economically. As used herein, the term "orientable shape" refers to those shapes of magnetic particles which conduce to the orientation or alignment thereof by reason of flow of the plastic melt.

While there have been described above the principles of this invention in connection with specific apparatus, it is to be clearly understood that this description is made only by way of example and not as a limitation to the scope of the invention.

What is claimed is:

1. The method of fabricating a permanently magnetizable body of plastic material filled with particles which are permanently magnetizable, said body having opposite ends and an axis of symmetry extending therebetween, comprising the steps of mixing quantities of plastic material and solid magnetizable particles to obtain a substantially uniform mixture, injection molding said body using said mixture; said molding step including injecting said mixture with said plastic in molten form into a cavity having the form of said body and through a gating orifice on said axis, said orifice opening radially into said cavity uninterruptedly completely around said axis whereby the molten mixture fills said cavity uniformly radially from said orifice, said orifice being of a size in relation to said particles which causes at least some of said particles to become physically oriented in a common direction as they enter said cavity, and causing said molten plastic to solidify thereby securing said particles in position, said particles being thus dispersed substantially uniformly throughout the solidified body.

2. The method of claim 1 wherein a given quantity of said particles are of a common orientable shape such that the flow thereof through said orifice causes them to take on a common alignment within said cavity as well as in the solidified body.

3. The method of claim 1 wherein said body is cylindrical having a coaxial bore, said cavity having said gate in the bore portion substantially midway between the opposite ends thereof which is disc-shaped and coaxial with respect to said axis, said injecting step including injecting said mixture coaxially of said gate.

4. The method of claim 3 wherein said cavity and gate are formed by a multi-part mold, one of the mold parts having an elongate sprue connected at one end to the central portion of said gate, said step of injecting includes injecting said mixture into the opposite end of said sprue.

5. The method of claim 4 wherein said step of mixing includes mixing quantities of thermoplastic and magnetizable particles.

6. The method of claim 2 wherein said orientable particles are either isotropic or anisotropic.

* * * * *